US007825546B2

(12) United States Patent
Li et al.

(10) Patent No.: US 7,825,546 B2
(45) Date of Patent: Nov. 2, 2010

(54) SAFETY ELECTRICAL RECEPTACLE

(75) Inventors: Zhan-Wu Li, Shenzhen (CN); Lin-Kun Ding, Shenzhen (CN); Shih-Fang Wong, Taipei Hsien (TW); De-Hua Tong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 177 days.

(21) Appl. No.: 12/195,382

(22) Filed: Aug. 20, 2008

(65) Prior Publication Data

US 2009/0098754 A1 Apr. 16, 2009

(30) Foreign Application Priority Data

Oct. 15, 2007 (CN) ........................ 2007 1 0202061

(51) Int. Cl.
*H02H 11/00* (2006.01)

(52) U.S. Cl. ........................................................ 307/326

(58) Field of Classification Search .................. 307/326
See application file for complete search history.

(56) References Cited

U.S. PATENT DOCUMENTS

| | | | | |
|---|---|---|---|---|
| 4,148,536 | A * | 4/1979 | Petropoulsos et al. | 439/188 |
| 4,853,823 | A * | 8/1989 | Arechavaleta et al. | 361/100 |
| 7,575,467 | B2 * | 8/2009 | Ferguson et al. | 439/489 |

* cited by examiner

*Primary Examiner*—Robert L. Deberadinis
(74) *Attorney, Agent, or Firm*—Frank R. Niranjan

(57) ABSTRACT

An electrical receptacle to prevent injuries deduced by misoperation is provided in the present invention. The electrical receptacle includes a power socket, a direct current (DC) power supply, a detecting switch, a controller, and a relay form a circuit loop for detecting whether a power plug is inserted into the power socket. The detecting switch is placed under the power socket without any electrical connection with the power socket. A live wire is connected to the power socket via a switch of the relay and a neutral wire is connected to the power socket directly. The switch of the relay closes on condition of the relay is electrified by the DC power supply.

15 Claims, 8 Drawing Sheets

SAFETY ELECTRICAL RECEPTACLE

BACKGROUND

1. Technical Field

The present invention relates to a socket, particularly to an electrical receptacle to prevent injuries caused by misoperation.

2. Description of Related Art

Some standard household or commercial electrical receptacles can present a serious shock hazard when the receptacles are open and accessible to children. Most of electrical receptacles are positioned in the wall 1 to 5 feet above the ground for convenience. However, it is also convenient for children to reach the electrical receptacles and easy to get hurt by intentional or inadvertent insertion of an electrical conducting material into a power socket of the electrical receptacle.

SUMMARY

In view of the foregoing disadvantages inherent in some known electrical receptacles, the present invention provides a safe electrical receptacle prevent accidental electrical shock and injury to children and others by intentional or inadvertent insertion of an electrical conducting material into the power socket. The safe electrical receptacle also can prevent children's misoperation.

An electrical receptacle includes a power socket, a direct current (DC) power supply, a detecting switch, a controller, and a relay, forming a circuit loop for detecting whether a power plug is inserted into the power socket. The detecting switch is placed under the power socket without any electrical connection with the power socket. A live wire is connected to the power socket via a switch of the relay and a neutral wire is connected to the power socket directly. The switch of the relay is closed on condition of the relay is electrified by the DC power supply.

DETAILED DESCRIPTION OF THE EMBODIMENTS

Figure 1:
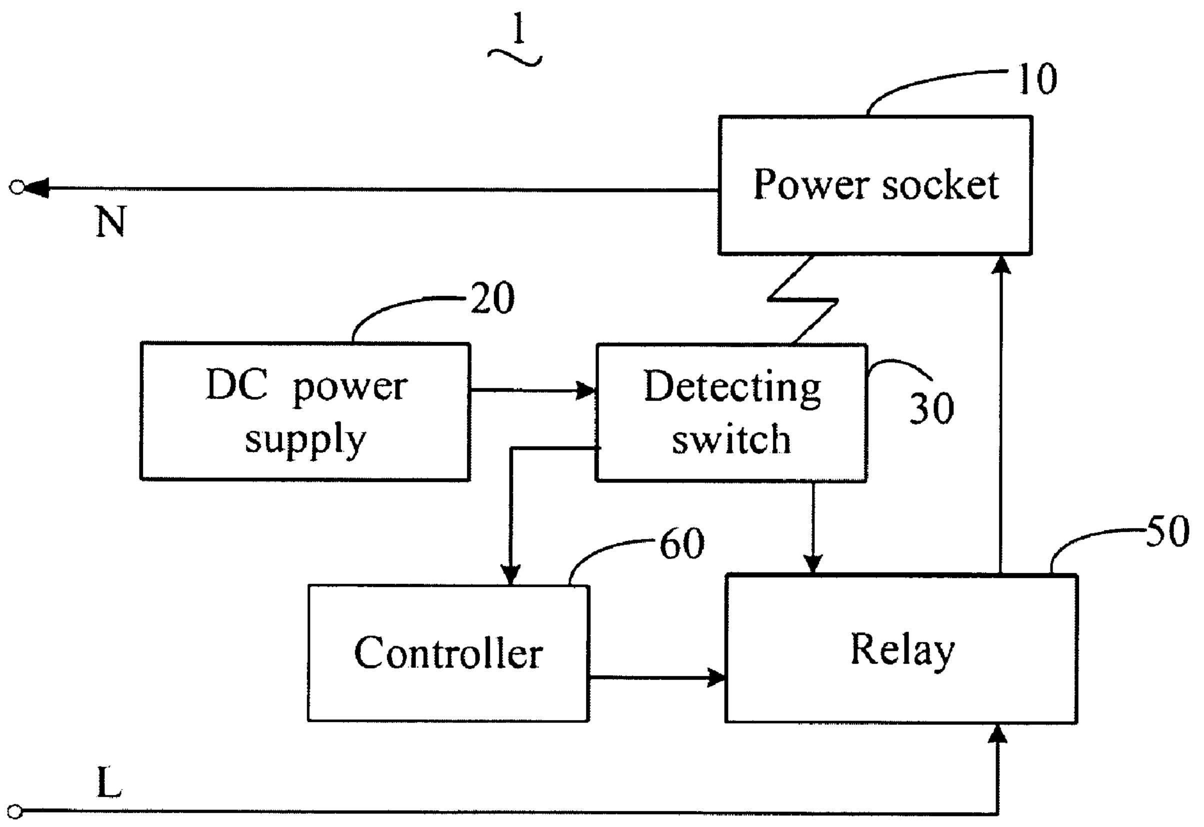
FIG. 1 is a block diagram of an electrical receptacle in accordance with an exemplary embodiment of the present invention.

FIG. 1 is a block diagram of an electrical receptacle 1 in accordance with an exemplary embodiment of the present invention. The electrical receptacle 1 includes: a power socket 10, a direct current (DC) power supply 20, a detecting switch 30, a relay 50, and a controller 60. A live wire (labeled as L) is connected to the power socket 10 via the relay 50 and a neutral wire (labeled as N) is connected to the power socket 10 directly. The DC power supply 20, the detecting switch 30, the relay 50, and the controller 60 form a circuit loop for detecting whether a power plug 2 (shown in FIG. 2) is inserted into the power socket 10. The detecting switch 30 is placed under the power socket 10 without any electrical connection with the power socket 10. An input terminal of the detecting switch 30 is connected to the DC power supply 20 for obtaining a DC supply. An output terminal of the detecting switch 30 is connected to the relay 50 for providing a control signal to control the relay 50. The relay 50 is connected to the DC power supply 20 via the detecting switch 30. The relay 50 is attracted on condition that the detecting switch 30 is closed.

Figure 2:
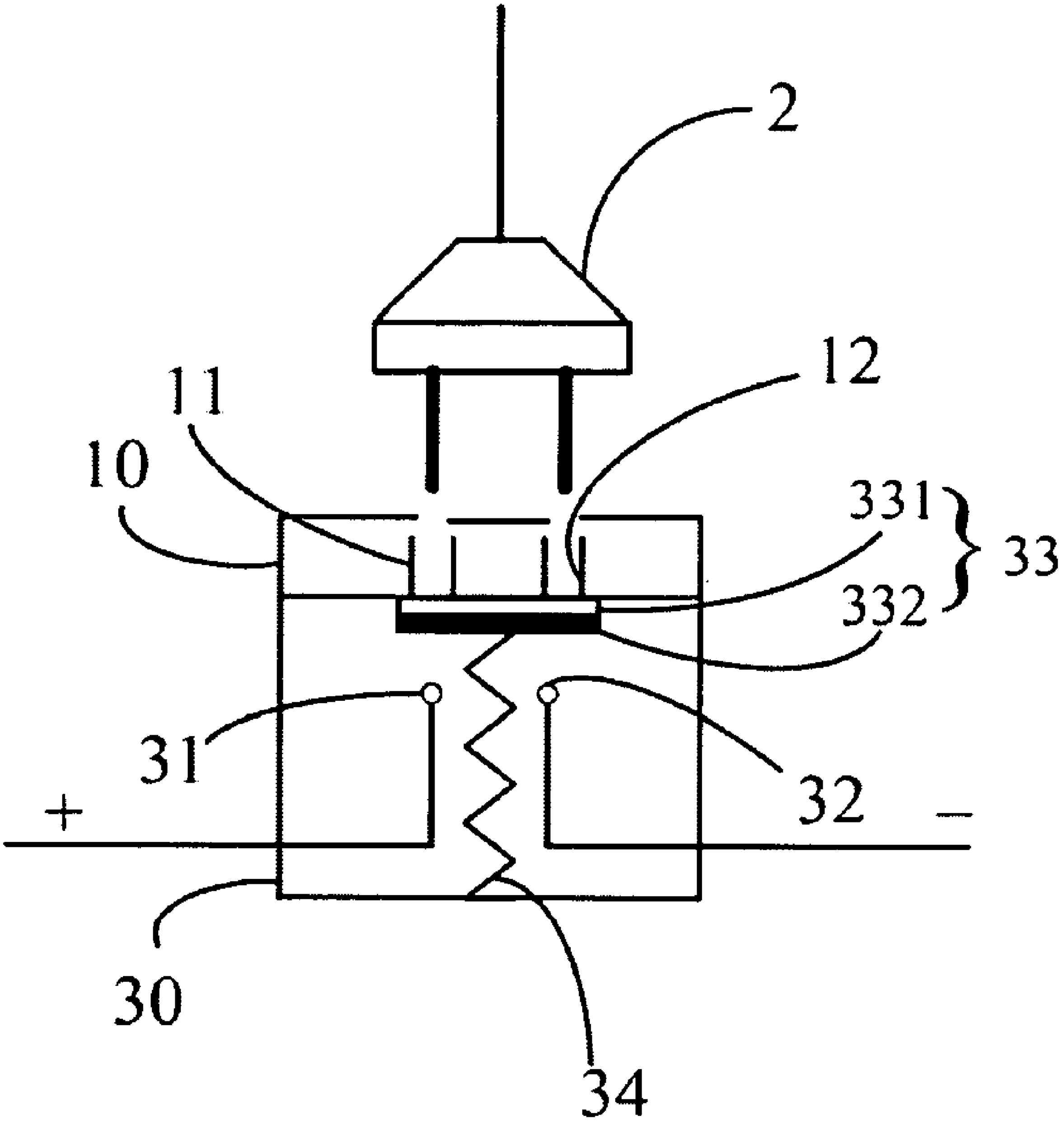
FIG. 2 is a schematic view showing a connection state between the power socket and the detecting switch of FIG. 1 before an electrical plug is inserted into the power socket.

FIG. 2 is a schematic view showing a connection state between the power socket 10 and the detecting switch 30 before the electrical plug 2 is inserted into the power socket 10. The power socket 10 includes a live wire terminal 11 connected to the live wire (L) via the relay 50, and a naught terminal 12 connected to the neutral wire (N). The detecting switch 30 includes an input terminal 31, an output terminal 32, a contactor 33 consisting of an insulating member 331 and a conducting member 332 and a spring member 34 placed just under the contactor 33 for supporting the contactor 33. The conducting member 332 faces the spring 34, and the insulating member 331 faces the socket 10. The live wire terminal 11 and the naught terminal 12 stand on the opposite ends of the insulating member. The input terminal 31 and the output terminal 32 keep a space from the conducting member 332 when the spring member 34 is in an equilibrium position; therefore, the input terminal 31 and the output terminal 32 are electrically insulated before the power socket 10 is pushed down. The contactor 33 is mounted in the structure in such a way that it is capable of tilting toward either of the two terminals 31 and 32.

Figure 3:
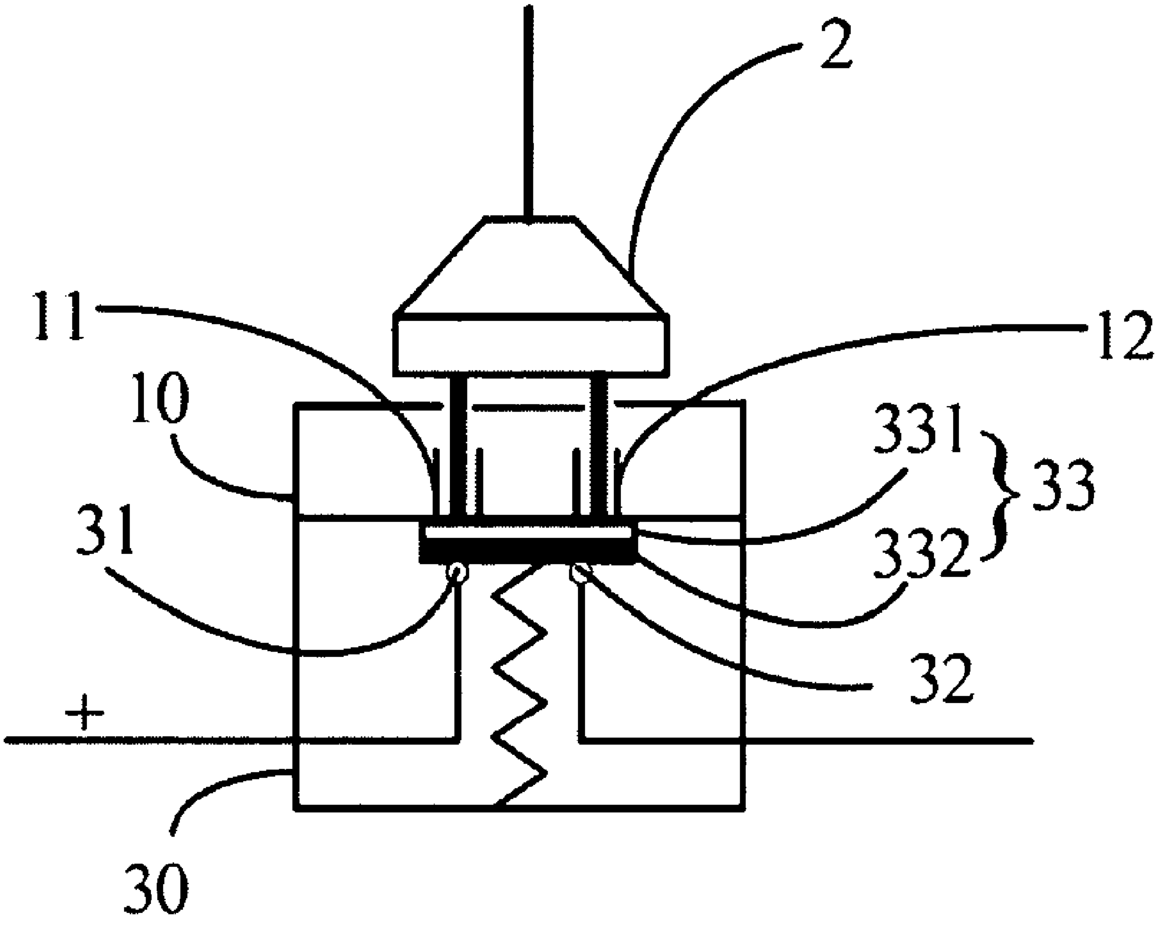
FIG. 3 is a schematic view showing a connection state between the power socket and the detecting switch of FIG. 1 after the electrical plug has been inserted into the power socket.

FIG. 3 is a schematic view showing a connection state between the power socket 10 and the detecting switch 30 after the electrical plug 2 has been inserted into the power socket 10. After the power plug 2 has been inserted into the power socket 10, the contactor 33 is pushed down and the spring member 34 changes to a depressed state, therefore, there is no space between the contactor 33 and the input terminal 31 as well as the output terminal 32. That is, the input terminal 31 and the output terminal 32 are electrically conducted when the power plug 2 is inserted into the power socket 10.

Figure 4:
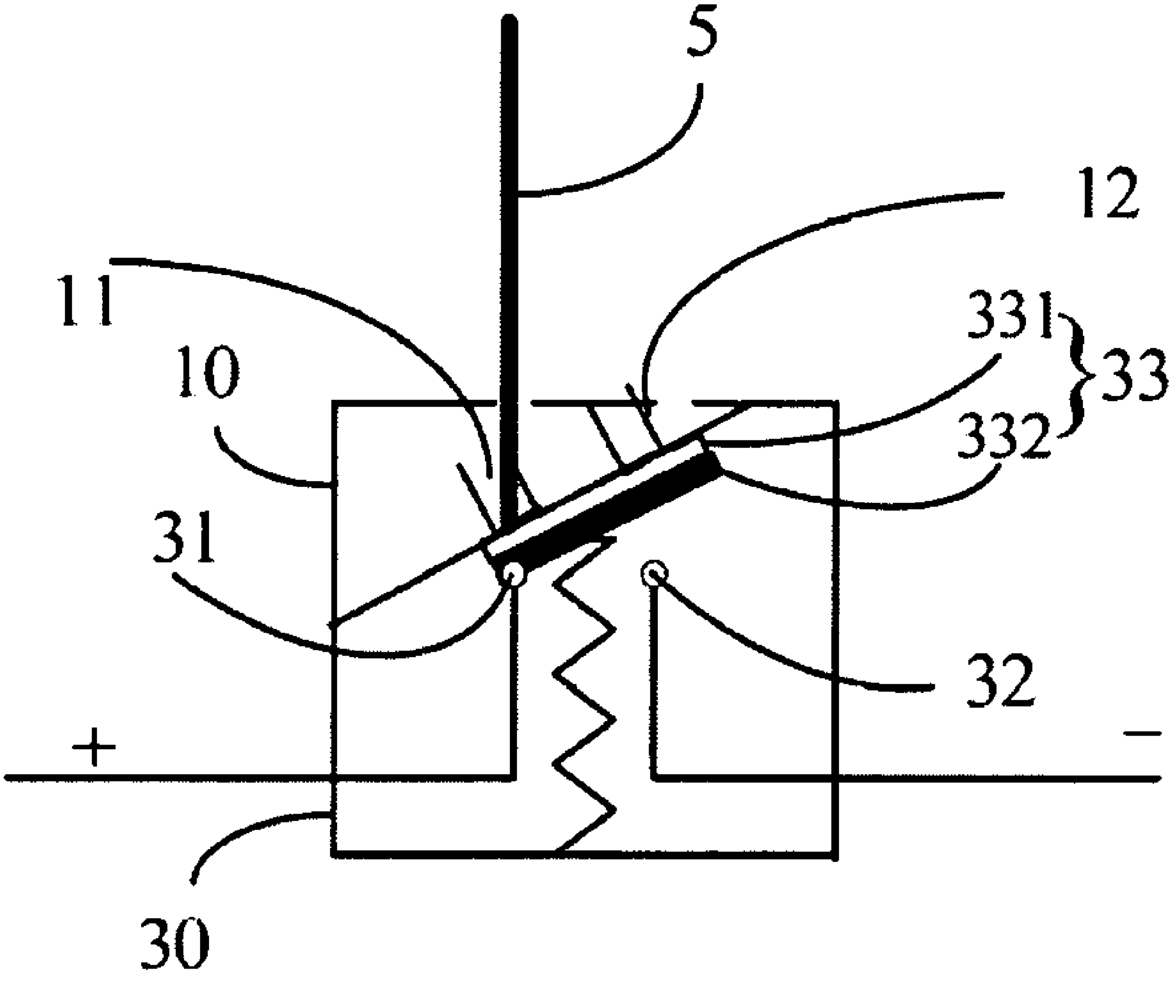
FIG. 4 is a schematic view showing a connection state between the power socket and the detecting switch of FIG. 1 after a pole or other conductor has been inserted into the power socket.

FIG. 4 is a schematic view showing a connection state between the power socket 10 and the detecting switch 30 after a pole 5 or other conductor has been inserted into the power socket 10. When the pole 5 or other conductor is inserted into the power socket 10 as shown in FIG. 4, one end of the conductor 33 tilts and the spring member 34 is still in the equilibrium position because of the unbalance force exerted on the contactor 33. The input terminal 31 and the output terminal 32 are electrically disconnected because of the tilted contactor 33.

Figure 5:
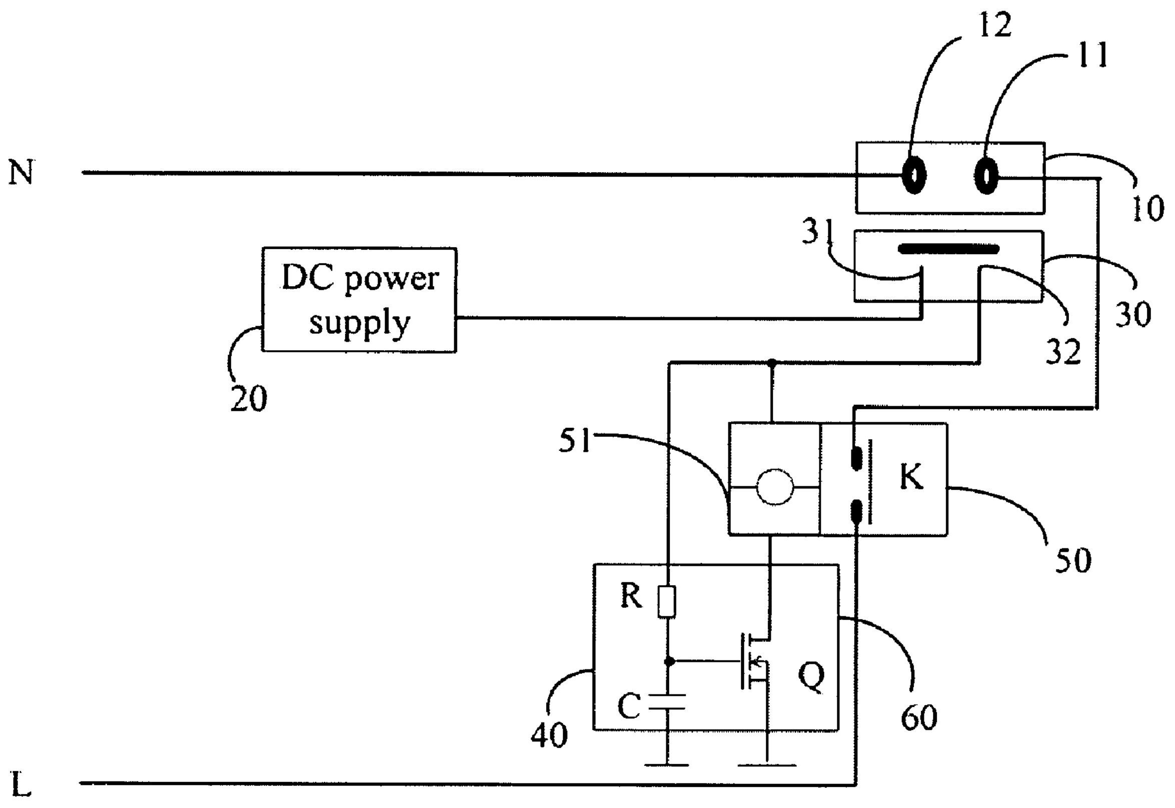
FIG. 5 is a schematic circuit diagram of the electrical receptacle of FIG. 1.

FIG. 5 is a schematic circuit diagram of the electrical receptacle 1. The relay 50 includes a coil 51 and a switch K. One end of the switch K is connected to the live wire terminal 11 of the power socket 10, and the other end of the switch K is connected to the live wire (L). The coil 51 is placed between the output terminal 32 and the controller 60. The controller 60 includes a MOSFET Q, a resistor R, and a capacitor C. The MOSFET Q is placed between the relay 50 and the ground. The capacitor C is placed between the outer terminal 31 and the ground. The resistor R is serially connected with the capacitor C. The grid of the MOSFET Q is connected to the junction between the resistor R and the capacitor C. The drain of the MOSFET Q is connected to the ground and the source of the MOSFET Q is connected to the coil 51.

When the power plug 2 is inserted into the power socket 10, the contactor 33 is pushed down and conducts the input terminal 31 and the output terminal 32. The coil 51 is electrified by the DC power supply 20 to produce a magnetic force to attract the switch K. After the switch K is closed by the electrified coil 51, the live wire (L) is electrically connected to the live wire terminal 11. The conducted detecting switch 30 ensures the voltage presented on the capacitor C is high and keeps the relay 50 in the electrified state, therefore, the switch K keeps in the close state. If the power plug 2 is removed from the power socket 30, the spring member 34 returns to the equilibrium position, therefore, the input terminal 31 electrically isolates from the output terminal 32 and the relay 50 is de-energized. The switch K opens and the high voltage present on the capacitor C is released via the MOSFET Q.

If the pole 5 or other conductor is inserted into the power socket 10, the input terminal 31 and the output terminal 32 cannot be connected. Therefore, the relay 50 keeps the switch K in an open state, the live wire terminal 11 is isolated from the live wire (L), and no voltage would be presented in the live wire terminal 11 and the naught terminal 12.

Figure 6:
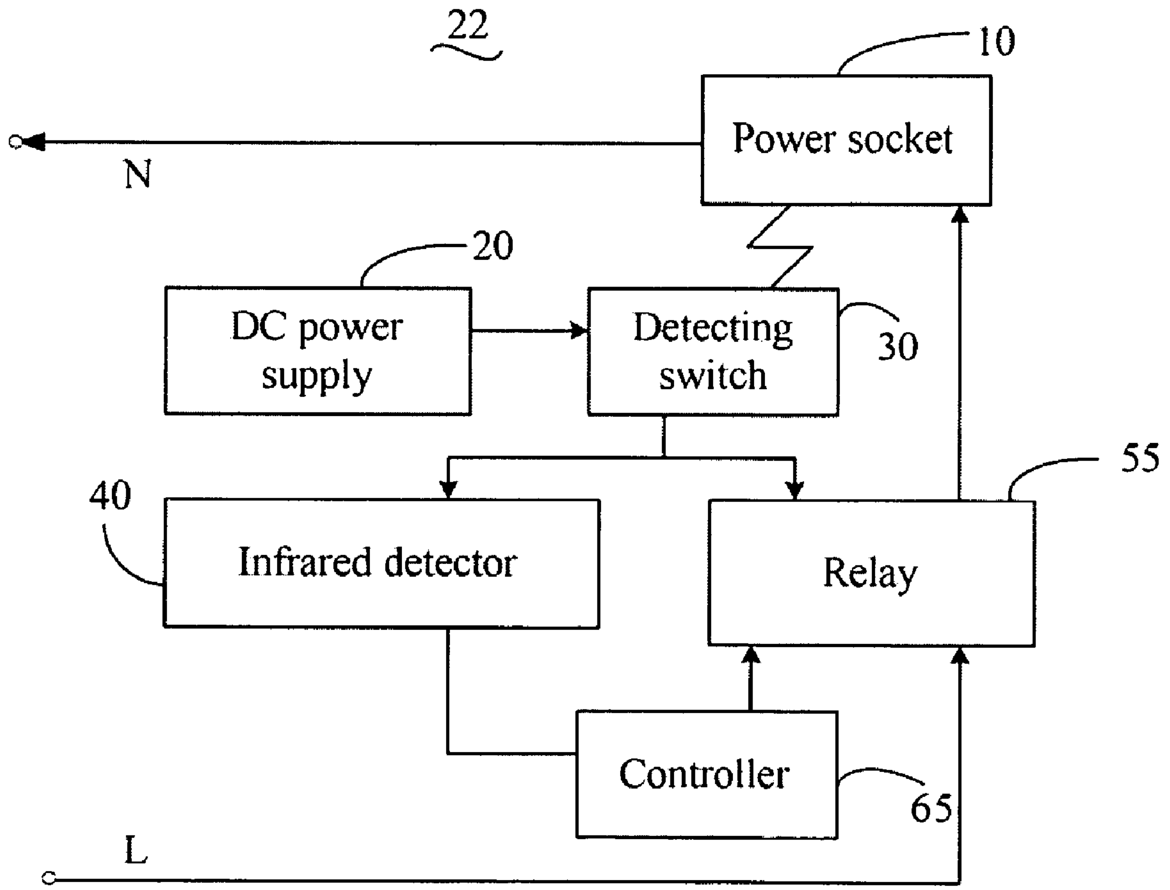
FIG. 6 is a block diagram of an electrical receptacle in accordance with a second exemplary embodiment of the present invention.

FIG. 6 is a block diagram of an electrical receptacle 22 in accordance with a second exemplary embodiment of the present invention. Compared with the electrical receptacle 1 in the first exemplary embodiment, the electrical receptacle 22 further includes an infrared detector 40. The infrared detector 40 is placed between the detecting switch 30 and the controller 65. Furthermore, the controller 65 and the relay 55 are slightly different from the controller 60 and the relay 50. Detailed description of the controller 65 and the relay 55 will be described in FIG. 7.

Figure 7:
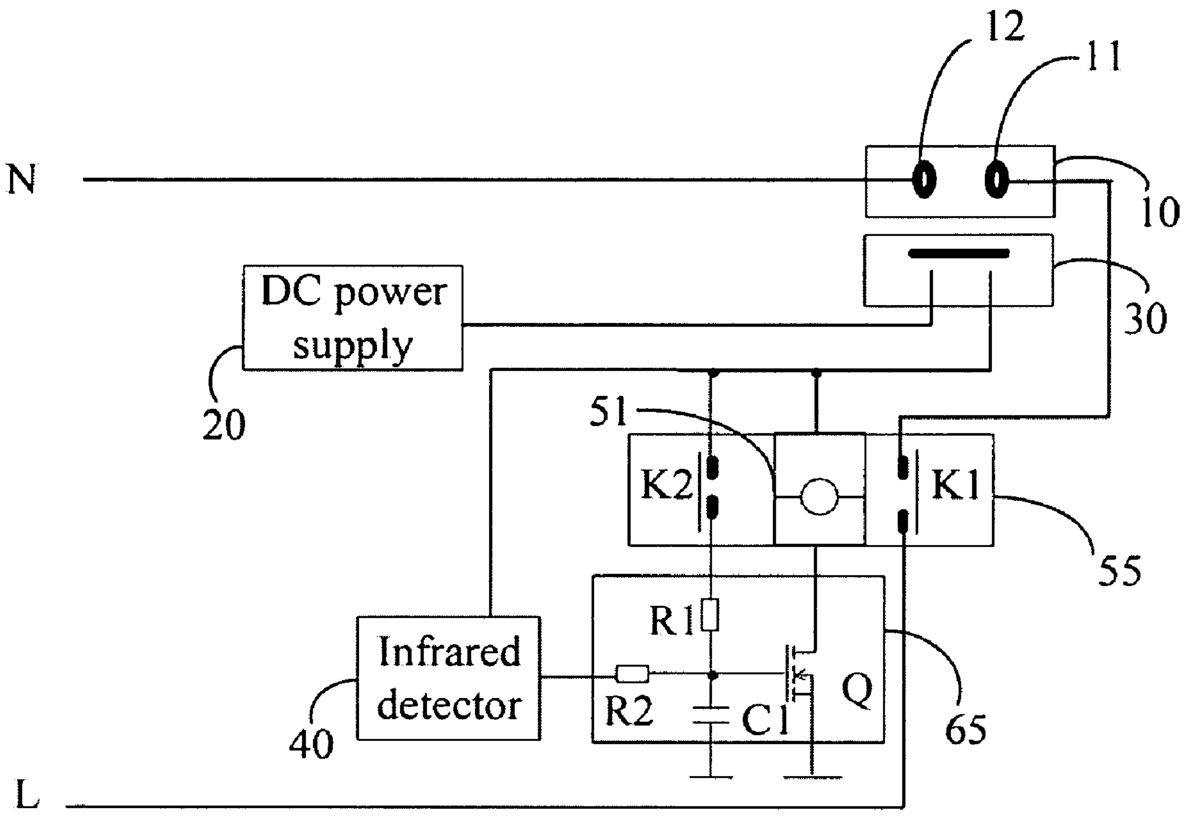
FIG. 7 is a schematic circuit diagram of the electrical receptacle of FIG. 6.

FIG. 7 is a schematic circuit diagram of the electrical receptacle 22. Compared with the relay 50 of FIG. 5, the relay 55 includes a first switch K1 and a second switch K2 controlled by the coil 51. The second switch K2 is placed between the detecting switch 30 and the controller 65. Compared with the controller 60 of FIG. 5, the controller 65 includes a first resistor R1 connecting with the first K1 and a second resistor R2 for introducing the infrared detector 40. If the infrared detector 40 outputs a high voltage level on the grid of the MOSFET Q, the voltage presented on the capacitor C is increased so that the relay 55 activates to attract the first switches K1 and the second K2. Therefore, the live wire (L) is electrically connected to the live wire terminal 11.

Figure 8:
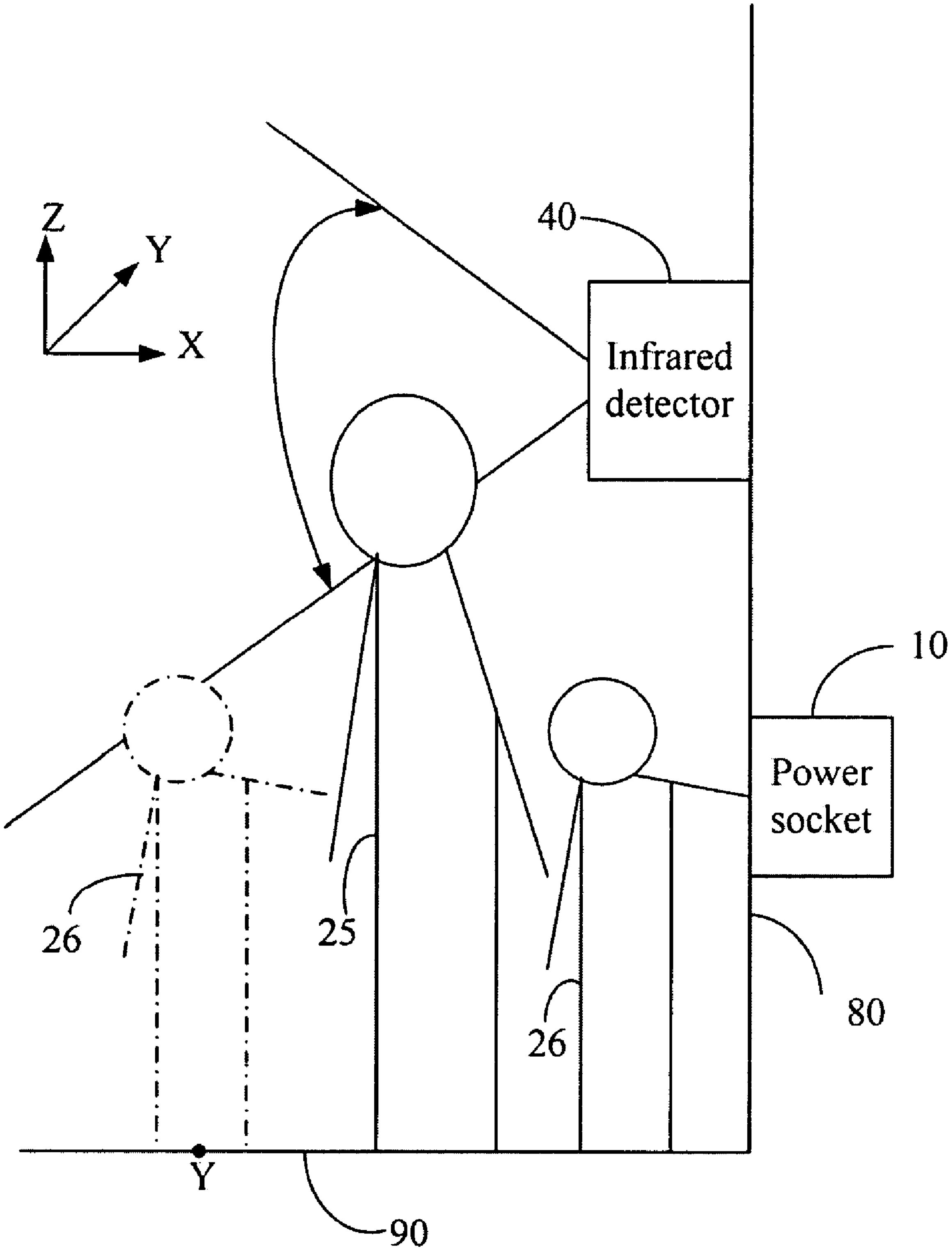
FIG. 8 is a schematic diagram showing how the electrical receptacle prevents injuries to children.

FIG. 8 is a schematic diagram showing how the electrical receptacle prevents injuries for children. The lines 80 and 90 present a wall and a floor of a room respectively. A higher person 25 represents an adult whose height is in a certain range, for example, from 1.5 to 2 meters, and a shorter person 26 represents a child whose height is in another certain range, for example, less than 1.2 meters. The power socket 10 is positioned in the wall 10 about 1 meter above the floor 90 so as to allow person conveniently to operate the power socket 10. The infrared detector 40 is positioned higher than the power socket 10 about 1.5 meters above the floor 90 along the Z-axis. The position height of the infrared detector 40 can be adjusted according to the height of the adult members and a detecting range of the infrared detector 40. Suppose the detecting range of the infrared detector 40 is about 60 degrees represented by the arrow lines. When the power socket 10 detects a power plug is inserted, the DC power supply 20 supplies power to the infrared detector 40. If the infrared detector 40 detects a heat source (i.e., the person) in its detecting range, the infrared detector 40 outputs the high voltage level to the MOSFET Q. As shown in FIG. 8, the infrared detector 40 can detect the adult 25 when the adult 25 is inserting the power plug 2 into the power socket 10. However, the infrared detector 40 cannot detect the child when the child is inserting the power plug 2 into the power socket 10 until the child reaches to the point "Y" on the floor line 90 which is too far away from the power socket 10 to operate it. Therefore, the infrared detector 40 prevents the child from getting injuries even if the child is trying to insert a plug into the socket 10.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An electrical receptacle comprising a power socket, a direct current (DC) power supply, a detecting switch, a controller, and a relay, wherein the DC power supply, the detecting switch, the controller, and the relay form a circuit loop for detecting whether a power plug is inserted into the power socket; the detecting switch is placed under the power socket without any electrical connection with the power socket, and comprises an input terminal, an output terminal, a contactor, and a spring member, the contactor consists of an insulating member facing the power socket and a conducting member facing the spring member, and the spring member is placed under the contactor for bracing the contactor; the power socket comprises a naught terminal for connecting to a neutral wire directly and a live wire terminal for connecting to a live wire via a switch of the relay; wherein, when the power plug is inserted into the power socket, the contactor is pushed down and contacts the input terminal as well as the output terminal via the conducting member, the input terminal and the output terminal are electrically conducted and cause the switch of the relay to close, and the live wire terminal of the power socket connects to the live wire via the closed relay accordingly.

2. The electrical receptacle according to claim 1, wherein the live wire terminal and the naught terminal stand on the opposite ends of the insulating member to keep electrically separated.

3. The electrical receptacle according to claim 2, wherein the input terminal and the output terminal keep a space from the conducting member along the horizontal direction before the power socket is pushed down.

4. The electrical receptacle according to claim 2, wherein the relay comprises a coil and a first switch; one end of the first switch is connected to the live wire terminal of the power socket, and the other end of the first switch is connected to the live wire.

5. The electrical receptacle according to claim 4, wherein the controller comprises a MOSFET and a resistor, the MOSFET is placed between the relay and the ground, and the resistor is in serial connected with a capacitor placed between the outer terminal and the ground.

6. The electrical receptacle according to claim 5, wherein the grid of the MOSFET is connected to the junction of the resistor and the capacitor; the drain of the MOSFET is connected to the ground; and the source of the MOSFET is connected to the coil.

7. The electrical receptacle according to claim 6, wherein the junction of the resistor and the capacitor presents a high voltage on condition that the power plug is inserted into the power socket; the MOSFET is conducted if the grid receives an high voltage from the junction between the resistor and the capacitor; the coil is electrified by the DC power supply to produce a magnetic force to attract the switch of the relay on condition that the MOSFET is conducted.

8. The electrical receptacle according to claim 4, further comprising an infrared detector connected between the detecting switch and the controller.

9. The electrical receptacle according to claim 8, wherein the relay further comprises a second switch; one end of the second switch is connected to the output terminal of the detecting switch, and the other end of the second switch is connected to the controller.

10. The electrical receptacle according to claim 9, wherein the controller comprises a MOSFET, a capacitor, a first resistor and a second resistor, the MOSFET is placed between the relay and the ground, the first resistor is connected with the outer terminal of the detecting switch via the second switch of the relay, the capacitor is serial connected with the first resistor and the ground, the second resistor is connected to the junction of the first resistor and the capacitor for introducing the infrared detector.

11. The electrical receptacle according to claim 10, wherein the grid of the MOSFET is connected to the junction of the first resistor and the capacitor; the drain of the MOSFET is connected to the ground; and the source of the MOSFET is connected to the coil.

12. The electrical receptacle according to claim 11, wherein the junction of the infrared detector outputs a high voltage level on the grid of the MOSFET, and the voltage presented on the capacitor is increased so that the relay activates to attract the first switch and the second switch.

13. The electrical receptacle according to claim 12, wherein a position where the infrared detector is disposed is higher than a position where the power socket is positioned; and the position where the infrared detector is disposed is adjustable according to heights of adult members and a detecting range of the infrared detector.

14. The electrical receptacle according to claim 13, wherein the infrared detector outputs the high voltage level to the MOSFET on condition that the infrared detector detects a heat source in its detecting range.

15. The electrical receptacle according to claim 14, wherein the infrared detector is positioned such that on the condition that the infrared detector outputs the high voltage level to the MOSFET, the person below certain height within the infrared detector's detecting range is away from the electrical receptacle not closer to a predetermined distance.

* * * * *